Nov. 29, 1927.
W. S. MAYERS
1,650,900
APPARATUS FOR HANDLING GLASSWARE
Filed Oct. 10, 1922
4 Sheets-Sheet 2

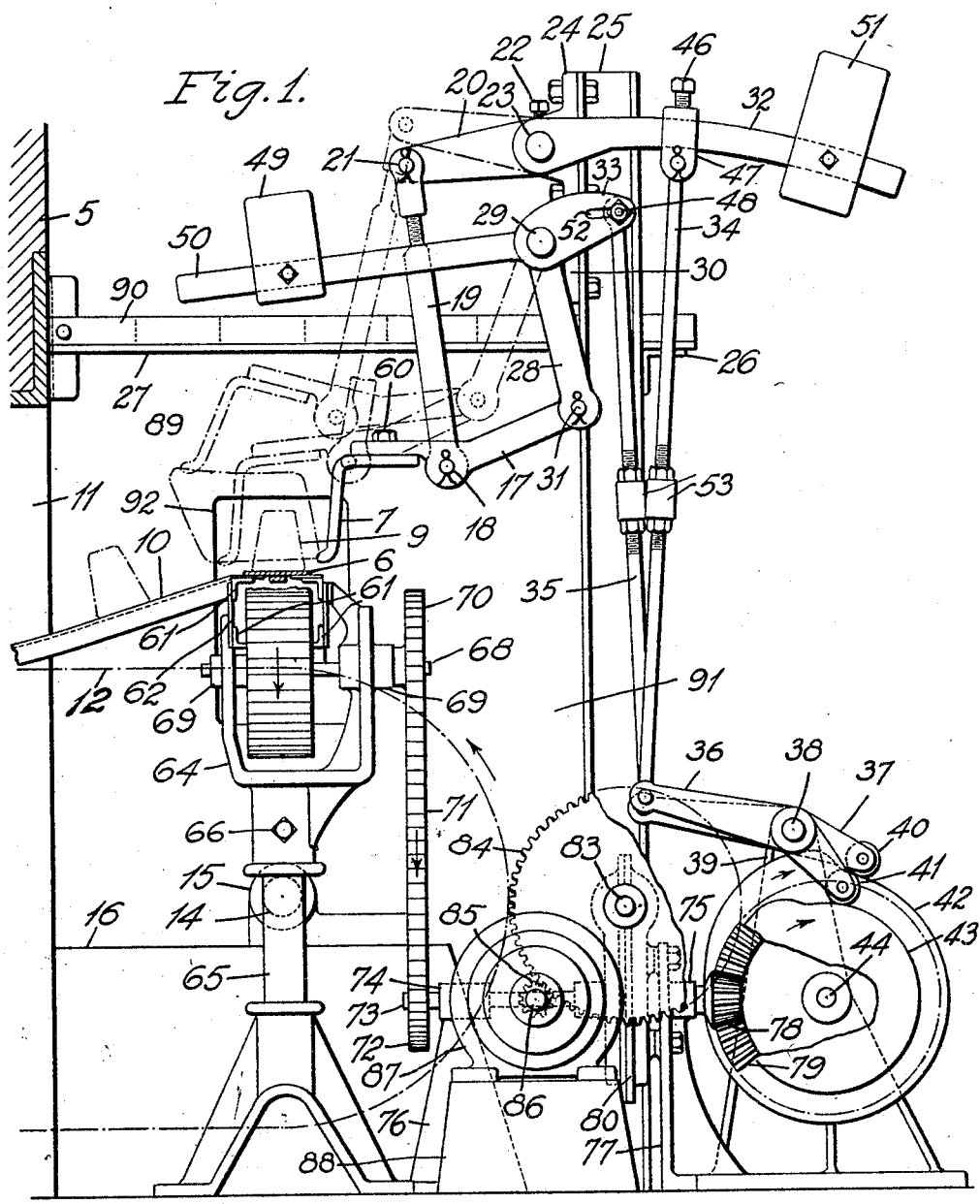

Inventor:
Wilbur S. Mayers
by W. H. Honiss
Atty.

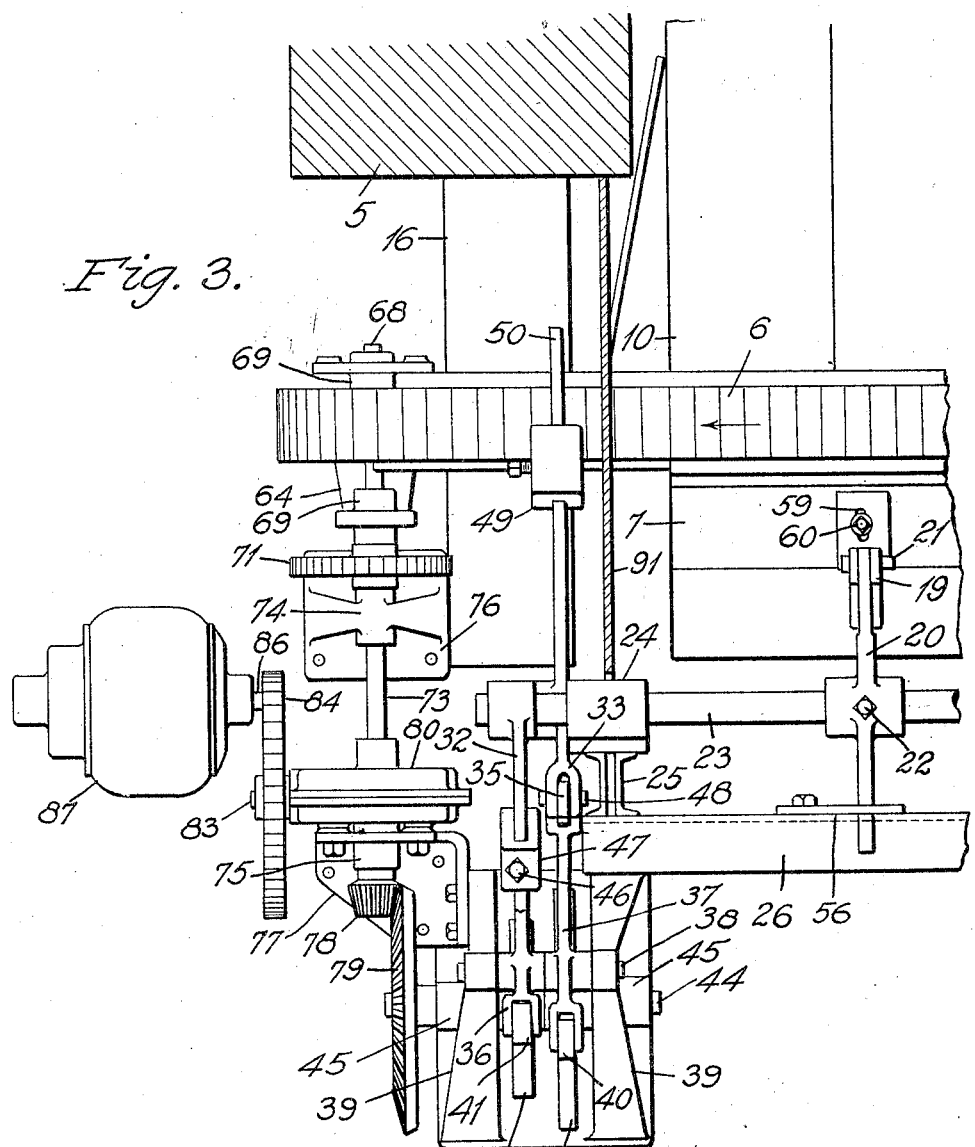

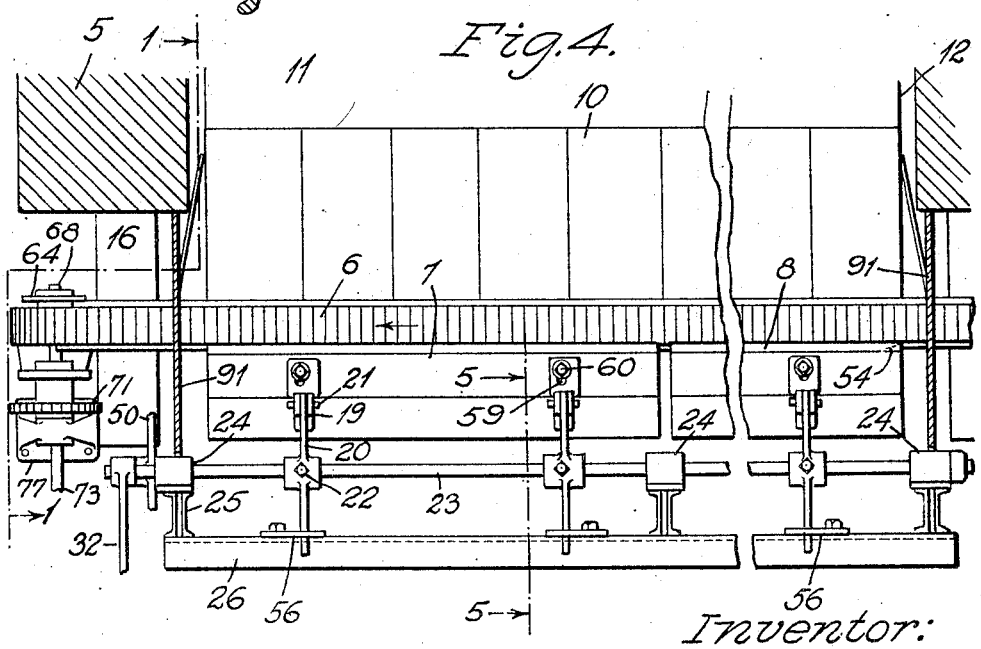

Patented Nov. 29, 1927.

1,650,900

UNITED STATES PATENT OFFICE.

WILBUR S. MAYERS, OF FAIRMONT, WEST VIRGINIA, ASSIGNOR TO MONONGAH GLASS COMPANY, OF FAIRMONT, WEST VIRGINIA, A CORPORATION OF WEST VIRGINIA.

APPARATUS FOR HANDLING GLASSWARE.

Application filed October 10, 1922. Serial No. 593,575.

The invention relates to apparatus for handling glassware, and has for its object to provide improved means for feeding the ware produced by one or more shaping machines to a leer of any suitable type by periodically delivering successive rows of the ware to the leer.

Other objects of the invention will appear from the descrpition to follow.

Preferred constructions and arrangements are shown in the drawings, in which:—

Figure 1 is a sectional elevation, on line 1—1 of Fig. 4, showing the suspended pusher and cross carrier with their combined operating mechanisms, the side wall of the enclosure for the cross carrier and other parts being removed;

Fig. 3 is a plan view of the mechanism shown in Fig. 2;

Fig. 4 is a plan on a reduced scale, partly in section, showing a portion of the leer and the apparatus for feeding the ware thereto, the top wall of the enclosure for the mechanism being removed;

Fig. 5 is a fragmentary sectional elevation taken on line 5—5 of Fig. 4;

Fig. 6 is a view in elevation, looking from the right of Fig. 5; and

Figure 2:
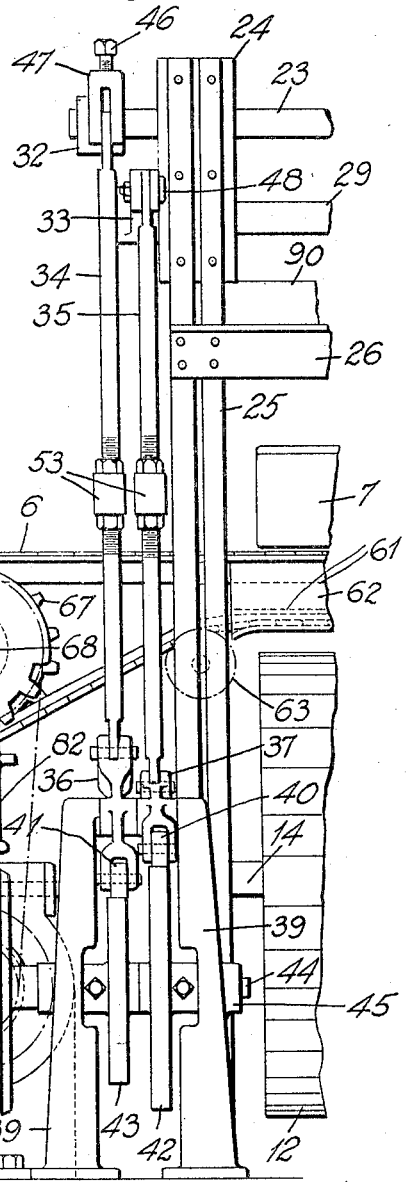
Fig. 2 is an end elevation of the pusher operating mechanism.

The apparatus shown comprises a leer 5 of any suitable construction, adjacent to which is mounted a cross carrier or conveyor 6, over which is suspended a pusher or transfer device, preferably comprising two or more sections 7 and 8 mounted for reciprocation or back and forth movement over the carrier 6 in a manner presently to be described, pushing the ware from the carrier onto the leer conveyor or onto the chute 10 extending into the leer passage 11. In the latter case the ware slides from the chute onto the leer conveyor 12, which may be of any suitable type and arranged to travel through the leer at the desired speed, the path of the leer conveyor being indicated by dotted line 12 in Fig. 1. The leer conveyor 12 may be carried by suitable sprocket shafts 14 (Fig. 2), journaled in bearings 15 on the base blocks 16 (Figs. 1 and 3) and may be driven by any suitable power means, in any well known way.

The pusher sections 7 and 8, which may be in one piece if desired, are suitably connected with the inner ends of the levers 17, pivotally connected at 18 with the adjustable links 19 depending from the horizontally disposed arms 20 and supported thereon by the pivot pins 21. The arms 20 are adjustably secured, by means of the set screws 22, upon the overhead rock shaft 23, journaled in bearings 24 on the upright frame members 25. The frame members are connected by a bar 26, which is suitably connected with the leer and braced by the bars 27.

The levers 17 are pivoted at 31 to the arms 28 on the rock shaft 29 to control the pusher movements. The shaft 29 is journaled in stationary bearings 30 carried by the frame of the machine.

The rock shafts 23 ad 29 are provided with outwardly extending arms 32 and 33 respectively, with which are pivotally connected the downwardly extending rods 34 and 35. These rods are operatively connected with the cam actuated levers 36 and 37, pivoted upon a shaft 38, supported by the brackets 39. The outer ends of the levers are provided with rollers 40 and 41 engaging the pusher and lift cams 42 and 43 respectively. The cams 42 and 43 are mounted on a shaft 44 journaled in bearings 45 carried by said brackets.

In order to vary the time period of change from the advancing to the returning stroke of the pusher, or to effect other desired changes in the path of movement of said pusher, the cams are made relatively adjustable upon the shaft 44 and are held in the desired angular relation thereon by set screws or other suitable means. By the angular adjustment of the cams the operation of the rock shaft 23 may be made to follow that of the rock shaft 29 to elevate the pusher at any desired period during its horizontal advancement, thus enabling the path of movement of the ware engaging edge of the pusher to be varied to suit different forms or sizes of ware, and to move the ware the desired distance. One such path is indicated by dot and dash line in Fig. 1.

The vertical and horizontal components of movement of the pusher are separately controlled by these cams 42 and 43 and can be varied by suitably varying the contours of the cams, whereby the ware contacting edge of the pusher can be made to move in any path desired. The cams may be provided with closed cam paths, but are preferably shown as open cams, for moving the pusher in one direction, its return movement being effected by springs or weights.

Further variations in the shape of the path traversed by the pusher may be effected by varying the proportions of the linkage system supporting the pusher, the essential feature being to return the pusher in such a manner as to clear the oncoming line of ware on the carrier. The forward pushing stroke should be rapid enough to move the articles out of the way of the oncoming line of ware on the carrier 6.

To a considerable degree the path of the pusher may be varied while the machine is in operation, and without changing the cams 42 or 43, by changing the effective length of one or both of the operating arms 32 and 33, and by adjusting their operating connections 34 and 35 inwardly or outwardly, depending upon whether it is desired to increase or decrease the stroke of the pusher either horizontally or vertically. Variation in the effective length of the arm 32 is effected by loosening the set screw 46 and moving the adjustable slide 47 inwardly or outwardly as desired. Likewise the effective length of the arm 33 may be varied by unclamping the pivot pin 48 of the connection 35 and moving it in the slot 52 the desired amount. Thus the two components of movement may be separately modified without stopping the machine.

An adjustable counterweight 49 on the arm 50 of the rock shaft 29 serves to effect the horizontal component of the return stroke of the pusher, while the forward horizontal stroke is made positive by the action of the pusher cam 42.

Since the return movements of the pusher are effected by weights or springs, no damage to the mechanism will result in case an article of ware accidentally lodges behind the pusher during its return. An adjustable counterweight 51 is preferably provided to take a substantial part of the roller pressure from the lifting cam 43, thus reducing the power required for operation.

The turnbuckles 53 afford means for adjusting the lengths of the rods 34 and 35 to permit the pusher to be adjusted to the desired vertical and horizontal working positions, without changing the amplitudes of its movements.

The working height of the pusher above the carrier may also be regulated without changing the amplitude of its vertical movements by lengthening or shortening the links 19, which are made in two parts, threaded together as shown in Fig. 1.

Ordinarily the on-coming ware on the carrier 6 would not travel the entire length of the pusher before the latter returns to its initial position after pushing off the previous row of ware. For this reason it is not usually necessary to lift the entire length of the pusher. This is one of the reasons for making the pusher in sections, so that the lifting movement may be confined to the section or sections which must be lifted to clear the on-coming ware on the carrier.

The vertical wing of the pusher is beveled at its outer end as shown at 54 in Fig. 4, in order to lessen the chances of impeding the succeeding row of ware on the cross carrier 6.

Any of the pusher sections can if desired, be lifted without lifting the other section or sections, and without stopping the operation of the machine, merely by loosening the screws 22 of the arms supporting the section or sections which need not be lifted. For example, the outer section 7 can ordinarily be moved back and forth in a substantially horizontal path without interfering with the on-coming ware on the carrier, since there will usually be sufficient time for the return of the section 7, before the ware reaches the length of the section 8, in which case only the section 8 needs to be lifted.

The arms 20 are provided with extensions which project under the lugs 55 of the brackets 56 which serve as stops for the down position of the pusher (Figs. 5 and 6). The brackets 56 extend upwardly from the frame member 26 and are secured thereon by bolts 57. The bolts extend through slots 58 in the brackets, whereby any one of the brackets may be vertically adjusted to adjust the down position of the pusher.

In order that the pusher sections may be adjusted laterally for proper alignment with the carrier, and with each other, the levers 17 supporting the sections are provided with slots 59 through which extend the bolts 60 for securing the sections upon the levers.

The carrier 6 may be of the link belt type and travels upon a frame comprising the upper and lower guide bars 61, which are connected by the side plates 62 (Fig. 1), the lower guide bars being shorter than the upper. At the end of the frame is a roller 63 over which the belt travels (Fig. 2), the roller being journaled in suitable bearings not shown.

The carrier is supported at its opposite ends by brackets 64 adjustable vertically upon standards 65 to permit the conveyor to be adjusted vertically relative to the pusher, the brackets being held in the desired position by set screws 66. The carrier belt is driven by sprockets 67 on shafts 68 journaled in bearings 69 on the brackets 64. The shaft 68 at the outer end of the conveyor is provided with a sprocket 70 driven by a chain 71 engaging a sprocket 72 on a driven shaft 73. The shaft 73 is journaled in bearings 74 and 75 carried by brackets 76 and 77 respectively. The outer end of the shaft 73 is provided with a pinion 78 meshing with a gear 79 on the cam shaft 44, whereby the pusher and lift cams 42 and 43 are actuated to effect operation of the pusher.

Bolted to the bracket 77 is a casing 80 in which is mounted a worm wheel 81, fast on the shaft 73. The worm wheel is driven by a worm 82 on a shaft 83, journaled in bearings formed on the casing 80. The outer end of the worm shaft 83 is provided with a gear 84 meshing with a pinion 85 on the driving shaft 86 of the motor 87, mounted on the base block 88.

In order to minimize the loss of heat through the leer entrance and also to provide for the heating of the ware contacting parts of the mechanism adjacent said entrance, an enclosure 89 is provided at this point in which the carrier 6 and pusher operate. The enclosure comprises the top and side walls 90 and 91 respectively and an end wall as well, if desired, in which an opening or door may be provided for access to the carrier. The enclosure may be constructed of suitable insulating material if preferred, and may form in effect a part of the leer or a continuation of the ware entrance passage in which the pusher is moved. The side walls of the enclosure are provided with openings 92 for the passage of the carrier 6.

The overhead suspension of the pusher permits free access to the carrier through the end of the enclosure in which said carrier moves and also reduces the space required for the installation of the machine.

The angular cross section of the pusher affords a vertical pushing wing and permits the ware on the cross carrier 6 to travel unimpeded under the horizontal wing of the section. Furthermore, the angular form of the pusher tends to prevent warping or twisting of the pusher by the heat to which it is subjected.

Figure 7:
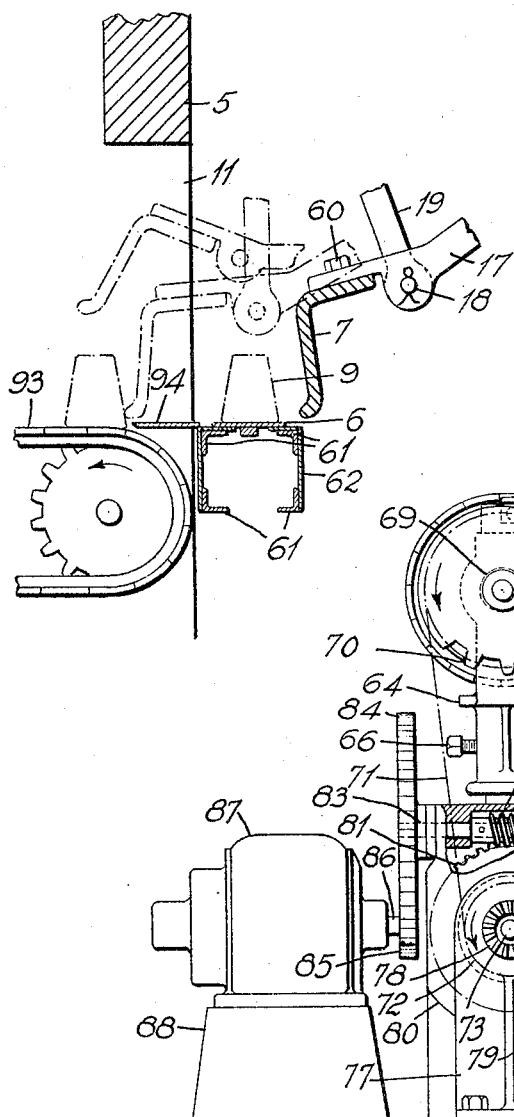
Fig. 7 is a diagrammatic sectional view of a modification, showing the cross carrier and pusher substantially on a level with the leer conveyor.

In the modification shown in Fig. 7 the carrier 6 is shown substantially on a level with the leer conveyor 93, the carrier being moved up close to the leer entrance so that the pusher may move into the leer and push the ware directly onto the leer pans.

In this case the ware is pushed from the carrier directly into the leer and onto the leer pans across a relatively narrow horizontal apron 94, supported in any suitable manner.

In case it is desired to feed the leer by hand, the counterweight 51 may be adjusted so as to maintain the pusher in its elevated position as shown in dotted lines in Fig. 1, or the mechanism may be stopped at that period of the cycle and the pusher held inoperative in its raised position. The ware may then be inserted in the leer in the usual manner through a door or doors provided in the front of the enclosure 89.

The illustrated embodiment of the invention may be modified in construction, arrangement, and mode of operation by those skilled in the art, without departing from the scope of the invention as defined in the appended claims.

I claim:

1. In glassware handling apparatus, in combination with a ware carrier, a pusher for the ware suspended for vertical and horizontal movements, and actuating means for the pusher adjustable to vary the amplitude relation of the movements.

2. In glassware handling apparatus, in combination with a ware carrier, a pusher for the ware suspended for horizontal and vertical movements, and means for actuating said pusher to effect said movements and adjustable to vary the amplitude relation of the movements.

3. In glassware handling apparatus, in combination with a ware carrier, a pusher for the ware, mounted for horizontal and vertical components of movement, and means for effecting said movements in variable time relation, and adjustable for effecting a variation in the amplitude of one of said movements.

4. In glassware handling apparatus, in combination with a ware carrier, a pusher for the ware, mounted for horizontal and vertical components of movement, and means for effecting said movements and adjustable to vary the amplitude of either of the movements.

5. In glassware handling apparatus, a carrier, a pusher comprising separate sections mounted adjacent the carrier for moving ware therefrom, and means for moving the sections in relatively different paths.

6. In glassware handling apparatus, a carrier, a pusher comprising separate sections mounted adjacent the carrier for moving ware therefrom, and means for imparting to the sections similar movements in one direction and different return movements.

7. In glassware handling apparatus, a carrier, a pusher comprising separate sections mounted adjacent the carrier for moving ware therefrom, means for moving the sections back and forth above the carrier, and means for effecting a variation in the path of movement of one or more of the sections.

8. In glassware handling apparatus, a carrier, a pusher comprising separate sections mounted adjacent the carrier for moving ware therefrom, and means for imparting the same or different movements to the sections.

9. In glassware handling apparatus, a carrier, a pusher comprising separate sections mounted adjacent the carrier for moving ware therefrom, actuating means for imparting movements to said sections, and means for causing a variation in the movement of one of the sections relative to the movement of the other, and without altering the actuating means.

10. In glassware handling apparatus, a carrier, a pusher comprising separate sections mounted adjacent the carrier for moving the ware therefrom, actuating means for imparting a back and forth movement to the sections, and means whereby the movement of one of the sections may be varied at will.

11. In glassware handling apparatus, in combination with a ware carrier, a pusher mounted to swing over the carrier in a closed path, and operating mechanism for the pusher having adjustable means for varying said path.

12. In glassware handling apparatus, in combination with a ware carrier, a pusher mounted to swing back and forth in a closed path over the carrier, a cam operatively connected with the pusher to move it through a portion of said path, and a second cam connected with the pusher for completing its said path of movement.

13. In glassware handling apparatus, in combination with a ware carrier, a pusher mounted to swing back and forth in a closed path over the carrier, separate cams connected with the pusher for effecting different portions of its movement in said path, and actuating means for the cams.

14. In glassware handling apparatus, in combination with a ware carrier, a pusher mounted to swing back and forth in a closed path over said carrier, separate cams connected with the pusher for effecting different portions of its movement in said path, said cams being relatively adjustable to vary their relative control of said movement.

15. In glassware handling apparatus, in combination with a carrier, a support, a pusher mounted for cyclic movement thereon, and separate devices for actuating the pusher at different periods to move it in relatively different paths during its cycle of movement.

16. In glassware handling apparatus, in combination with a carrier, a support, a link depending therefrom, a pusher carried by the link and movable relative thereto, means adapted to swing the link and guide the pusher in a predetermined path during its pushing stroke, and separate means adjustable for moving the link whereby to elevate and return the pusher to initial starting position and to vary its amplitude of movement.

17. In glassware handling apparatus, in combination with a carrier, a support, an adjustable link depending therefrom, a pusher carried by the link and movable relative thereto, and means connected with the pusher and adapted to swing and guide it in a predetermined path.

18. In glassware handling apparatus, in combination with a carrier, a support, a link suspended therefrom, a member pivoted upon the link, a pusher adjustable upon said member, and means for actuating the link and said member to move and guide the pusher in a predetermined path.

19. In glassware handling apparatus, in combination with a carrier, a movable support, a link suspended therefrom, a pusher carried by the link, means for swinging the link to move the pusher in a predetermined path, means for actuating the support and the link to elevate and return the pusher to initial starting position, and means for rendering said support inactive at will.

20. In glassware handling apparatus, in combination with a carrier, a support, a link suspended therefrom, a pusher carried by the link and movable relative thereto, a member connected with the pusher for swinging the link and moving the pusher in a predetermined path, and actuating means for said member adjustable to vary the extent of its movement, whereby to vary the amplitude of movement of the pusher.

21. Apparatus for handling glassware, comprising a carrier, a two-part pusher movable above the carrier, means for moving the pusher parts horizontally to move ware from the carrier, means for moving the pusher parts vertically, and means for disconnecting one of the parts from the means for imparting vertical movement whereby both parts are moved horizontally and either one or both parts may be moved vertically.

22. A leer feeder comprising a ware carrier moving transversely of the leer end, a ware pushing member, and movable means for moving the said member across the path of the ware carried by the carrier, to remove ware therefrom, said moving means, throughout their movement being located outside of said path, leaving it clear for the advancement of the succeeding ware along said path.

23. A leer feeder comprising a moving ware carrier moving transversely of the leer end, a pusher movable across the carrier toward and from the leer, to remove successive series of ware from the carrier, and means for raising the pusher above the top of the ware when moving away from the leer, the supporting connections for the pusher being at all times outside of the path of the ware advancing on the carrier.

WILBUR S. MAYERS.